United States Patent [19]

d'Entremont et al.

[11] Patent Number: 4,536,848

[45] Date of Patent: Aug. 20, 1985

[54] METHOD AND APPARATUS FOR COLORED COMPUTER GRAPHIC PHOTOGRAPHY

[75] Inventors: Alice M. d'Entremont, Boston; William T. Freeman, Cambridge, both of Mass.

[73] Assignee: Polaroid Corporation, Cambridge, Mass.

[21] Appl. No.: 595,675

[22] Filed: Apr. 2, 1984

Related U.S. Application Data

[63] Continuation of Ser. No. 368,711, Apr. 15, 1982, abandoned.

[51] Int. Cl.³ .......................... G09G 1/28; H04N 1/46
[52] U.S. Cl. .................................... 364/526; 340/703; 340/720; 355/20; 358/78; 358/332; 364/521; 364/525
[58] Field of Search ............... 364/521, 523, 525, 526; 340/703, 720, 721; 354/7; 355/20, 40; 358/332, 334, 32, 78

[56] References Cited

U.S. PATENT DOCUMENTS

| | | | |
|---|---|---|---|
| 2,531,031 | 11/1950 | de France et al. | 178/5.2 |
| 2,921,498 | 1/1960 | Simmon et al. | 364/525 X |
| 2,995,619 | 8/1961 | Freeman | 178/5.2 |
| 3,006,260 | 10/1961 | Smith et al. | 95/12 |
| 3,644,664 | 2/1972 | Huboi et al. | 178/5.2 A |
| 3,720,859 | 3/1973 | Hilden | 315/23 |
| 3,772,465 | 11/1973 | Vlahos et al. | 178/5.2 D |
| 3,938,164 | 2/1976 | Ohnishi et al. | 346/110 R |
| 4,009,489 | 2/1977 | Seer, Jr. | 358/80 |
| 4,112,459 | 9/1978 | Gautier et al. | 358/6 |
| 4,208,672 | 6/1980 | Améen et al. | 358/332 |
| 4,240,729 | 12/1980 | Barney | 354/76 |
| 4,263,001 | 4/1981 | Deutsch | 355/45 |
| 4,278,347 | 7/1981 | Okamoto et al. | 355/68 |
| 4,285,580 | 8/1981 | Murr | 351/35 |
| 4,373,156 | 2/1983 | Pfannkuch et al. | 340/703 |
| 4,438,453 | 3/1984 | Alston | 358/78 |
| 4,454,593 | 6/1984 | Fleming et al. | 364/521 |

OTHER PUBLICATIONS

Electronics, Sep. 22, 1981; "Microprocessor Controlled System Prints Color TV Pictures"; L. Levinson et al., pp. 121–125.

Primary Examiner—Felix D. Gruber
Assistant Examiner—Kevin J. Teska
Attorney, Agent, or Firm—Edward S. Roman

[57] ABSTRACT

Method and apparatus for making and photographing computer graphic colored images by defining each computer graphic colored image as a plurality of constant color pixel groups, assigning one of a preselected number of colors to each constant color pixel group, and exposing a photosensitive material to each constant color pixel group displayed in a predetermined ordered sequence and color.

13 Claims, 6 Drawing Figures

| NO | COLOR | RED FILTER EXP TIME | GRN FILTER EXP TIME | BLUE FILTER EXP TIME |
|---|---|---|---|---|
| 1 | RED | 30 | 0 | 0 |
| 2 | GRN | 0 | 30 | 0 |
| 3 | BLUE | 0 | 0 | 30 |
| 4 | YELLOW | 30 | 30 | 0 |
| 5 | CYAN | 0 | 30 | 30 |
| 6 | MAGENTA | 30 | 0 | 30 |
| 7 | YELLOW | 30 | 30 | 0 |
| 60 | PINK | 30 | 10 | 10 |

LOOK UP TABLE

| BASIC VARIABLE MEMORY | | | STEP I |
|---|---|---|---|
| CONSTANT COLOR PIXEL GROUPS | | | ITEM NO. |
| TEXT | 1ST WORD | COMPUTER | 1 |
| | 2ND WORD | GRAPHICS | 2 |
| | 30TH WORD | FINISH | 30 |
| FONT | 1ST WORD | ROMAN L.F. | 1 |
| | 2ND WORD | LARGE L.F. | 2 |
| | 30TH WORD | LARGE L.F. | 30 |
| POSITION | 1ST WORD | 1,1 = X POSITION OF 1ST WORD<br>2,1 = Y POSITION OF 1ST WORD | 1 |
| | 2ND WORD | 1,2 = X POSITION OF 2ND WORD<br>2,2 = Y POSITION OF 2ND WORD | 2 |
| | 30TH WORD | 1,30 = X POSITION OF LAST WORD<br>2,30 = Y POSITION OF LAST WORD | 30 |
| LINES | 1ST LINE | 1,1 = X POS. OF FIRST END POINT OF 1ST LINE<br>2,1 = Y POS. OF FIRST END POINT OF 1ST LINE<br>3,2 = X POS. OF 2ND END POINT OF 1ST LINE<br>4,2 = Y POS. OF 2ND END POINT OF 1ST LINE | 31 |
| | 5TH LINE | 1,5 = X POS. OF FIRST END POINT OF 5TH LINE<br>2,5 = Y POS. OF FIRST END POINT OF 5TH LINE<br>3,5 = X POS. OF 2ND END POINT OF 5TH LINE<br>4,5 = Y POS. OF 2ND END POINT OF 5TH LINE | 35 |
| RECTANGLES | 1ST RECT | 1,1 = X POS. OF FIRST END POINT OF DIAGONAL<br>2,1 = Y POS. OF FIRST END POINT OF DIAGONAL<br>3,1 = X POS. OF 2ND END POINT OF DIAGONAL<br>4,1 = Y POS. OF 2ND END POINT OF DIAGONAL | 36 |
| | 5TH RECT | 1,5 = X POS. OF FIRST END POINT OF DIAGONAL<br>2,5 = Y POS. OF FIRST END POINT OF DIAGONAL<br>3,5 = X POS. OF 2ND END POINT OF DIAGONAL<br>4,5 = Y POS. OF 2ND END POINT OF DIAGONAL | 40 |
| COLOR | | RED | 1 |
| | | RED | 2 |
| | | GREEN | 40 |

BASIC VARIABLE MEMORY    STEP II

| FILTER NO. | ITEM NO. | EXPOSURE TIME (SEC) | FILTER COLOR |
|---|---|---|---|
| 1 | 1 | 30 | RED |
| 2 | 1 | 0 | GRN |
| 3 | 1 | 0 | BLUE |
| 1 | 1 | 30 | RED |
| 2 | 2 | 0 | GRN |
| 3 | 2 | 0 | BLUE |
| 1 | 40 | 0 | RED |
| 2 | 40 | 30 | GRN |
| 3 | 40 | 0 | BLUE |

FIG. 5

BASIC VARIABLE MEMORY    STEP IV

| ITEM NO. | EXPOSURE TIME (SEC) | FILTER COLOR |
|---|---|---|
| 1,2 | 30 | RED |
| 1,2,8 | 25 | RED |
| 1,2,8,28 ETC. | 4 | RED |
| 40 | 30 | GRN |
| 29,40 | 27 | GRN |
| 29,16,40 ETC. | 3 | GRN |
| 12 | 30 | BLUE |
| 7,12 | 22 | BLUE |
| 7,12,18 ETC. | 2 | BLUE |

FIG. 6

METHOD AND APPARATUS FOR COLORED COMPUTER GRAPHIC PHOTOGRAPHY

This is a continuation of application Ser. No. 368,711, filed Apr. 15, 1982, abandoned.

BACKGROUND OF THE INVENTION

1. Field of the Invention

This invention relates generally to a method and apparatus for making and photographing computer graphic images and, more particularly, to a method and apparatus for making and photographing computer graphic colored images utilizing a minimum size computer memory.

2. Description of the Prior Art

The memory requirement for computer graphic colored images is generally determined by the spatial and color intensity resolution of the images. Thus, large computers with large memory capacities are ordinarily required for computer graphic colored images in order to store the many bits of information required to designate the brightness and color of each pixel of the image. Computer graphic images may be suitably displayed on any conventional viewing screen such as a cathode ray tube (CRT), and a photograph of the displayed image may be made in a manner as is well known in the art. Small computers generally do not have the memory base or the processing power to deal with images satisfactorily in this way and, therefore, are generally unsatisfactory for providing computer graphic colored images for photographic reproduction.

Therefore, it is a primary object of this invention to provide a method and apparatus utilizing a small computer and a limited computer memory for developing computer graphic color images on a photosensitive material.

Other objects of the invention will be in part obvious and will in part appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 3 is a chart tabulating the contents of a look-up table shown in FIG. 1;

FIG. 4 is a chart tabulating the data which defines the image to be photographed by the method of this invention;

FIG. 5 is a chart tabulating data at an intermediate step in the method of this invention; and FIG. 6 is a chart tabulating data derived in another step in the method of this invention.

SUMMARY OF THE INVENTION

A method for defining and photographing a graphic image comprises the steps of first defining and storing within a computer memory the graphic image to be photographed as a plurality of constant color pixel groups. The time during which a selected photosensitive material must be exposed to a selected light color intensity for each of the constant color pixel groups is text determined. The determined exposure times are then ordered for each of the constant color pixel groups into either a progressively increasing or decreasing sequence. Each of the constant color pixel groups are thereafter visually displayed at the selected light color and intensity for its determined exposure time to the photosensitive material. The visual display may start with the first of the constant color pixel groups in the ordered sequence and thereafter add each succeeding constant color pixel group in the ordered sequence to the visual display so as to finally display all of the constant color pixel groups simultaneously in the ordered sequence when the ordered sequence comprises progressively decreasing exposure times. Alternatively, the visual display may start by simultaneously displaying all the constant color pixel groups in the ordered sequence and thereafter eliminate from the visual display each succeeding constant color pixel group in the ordered sequence so as to finally display only the last of the constant color pixel groups in the ordered sequence when the ordered sequence comprises progressively increasing exposure times.

DESCRIPTION OF THE PREFERRED EMBODIMENT

Figure 1:
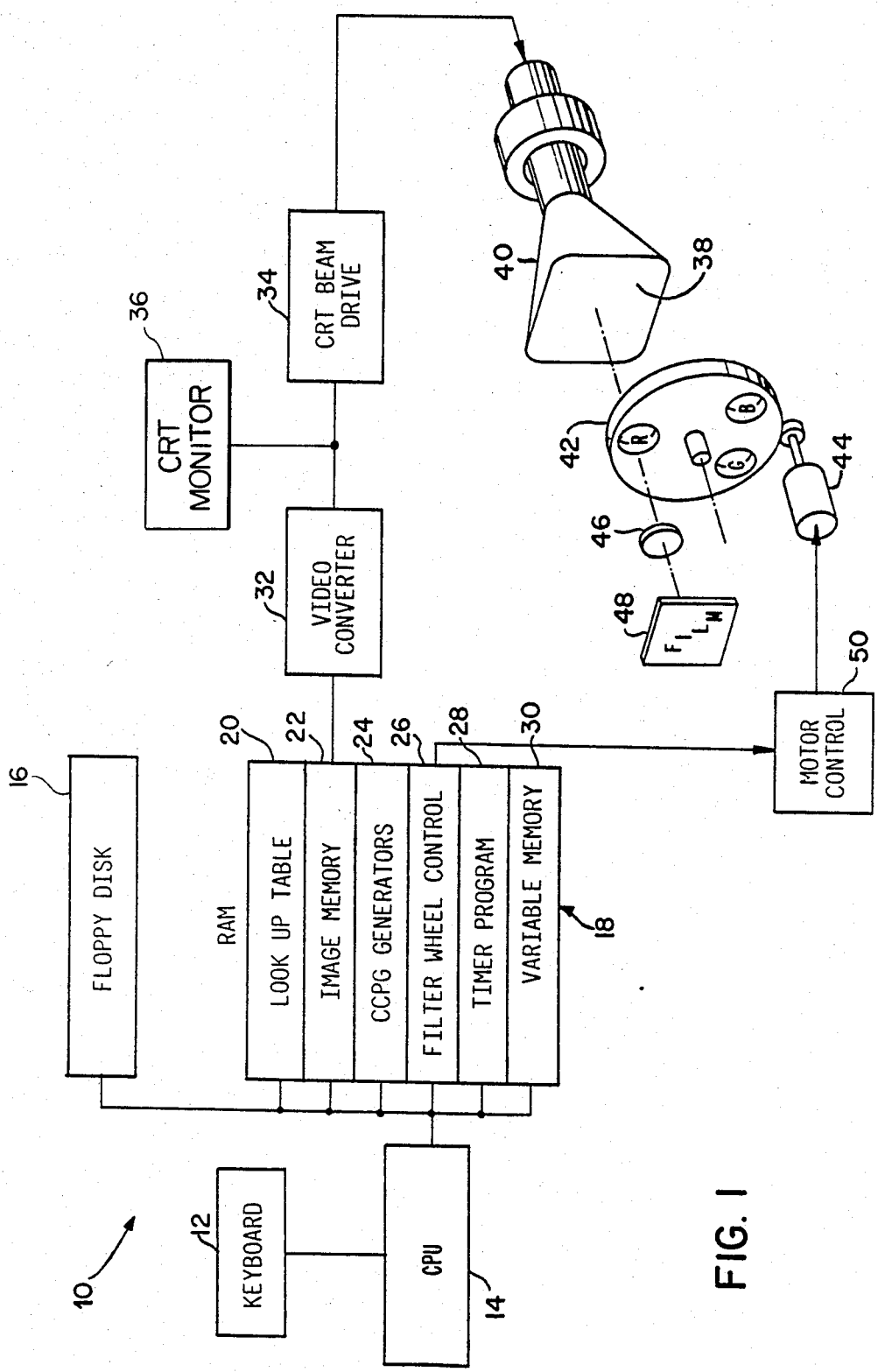
FIG. 1 is a block diagram of a system for defining and photographing a graphic image in the manner of this invention.

Referring now to FIG. 1, there is shown a system for defining and displaying an image to be photographed in the manner of this invention. A computer system as shown generally at 10 comprises an input terminal such as a key-board 12, a central processing unit 14, and a computer memory which may comprise an external storage medium such as a floppy disk 16 and an internal random access memory (RAM) 18. The RAM 18, in turn, comprises a look-up table 20, an image memory 22, CCPG generators 24, a filter wheel control 26, a timer program 28, and a variable memory 30. The output signal from the image memory 22 is directed to a video converter 32 which, in turn, provides an output signal to a cathode ray tube beam drive 34.

The output from the cathode ray beam drive 34, in turn, is directed to a black-and-white cathode ray tube 40 having a display screen 38 overlapped by a rotatably mounted filter wheel 42. The filter wheel 42, in turn, comprises the three primary red, green, and blue color filters each one of which may be selectively moved into overlying relationship with respect to the display screen 38 by a motor drive 44. The light from the display screen 38 is transmitted through a selected one of the red, green, and blue filters of the filter wheel 42 to a lens 46 from which it is imaged on the surface of a photosensitive material as shown at 48. As will be readily understood, the cathode ray tube 40, the filter wheel 42, the lens 46, and the photosensitive material 48 are all housed in a suitable lighttight chamber (not shown in the drawing). Motor 44, in turn, is controlled by a motor control 50 which receives an output control signal from the filter wheel control 26.

A black-and-white cathode ray tube monitor 36 is also provided for use by the system user in order to enable him to define the computer graphic image to be photographed. Thus, the system user by use of the keyboard 12 and the black-and-white monitor 36 can define what the image to be photographed is to be. The system user can define the image to be photographed by making choices from lists of options presented to him by way of program menus and questions. The program menus and questions lead the user through a series of steps which enable him to define the image in a manner as is illustrated in step I of the flow chart of FIG. 2 in conjunction with the tabulated chart of FIG. 4.

Figure 2:
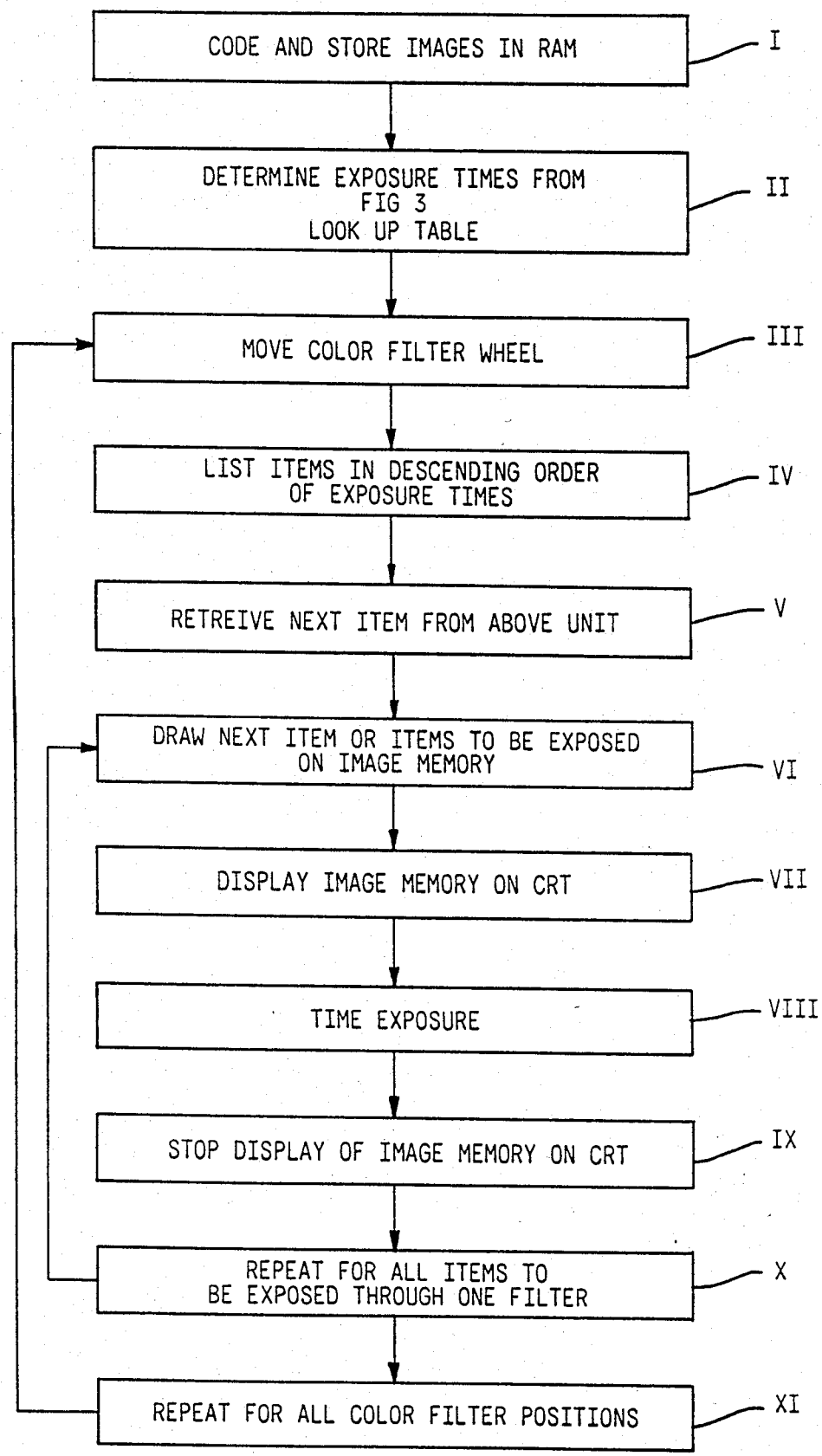
FIG. 2 is a block diagram of a flow chart for the series of steps to be implemented in practicing the process of this invention.

The first step that the user takes is to code and store the image to be photographed in the RAM 18 as shown by block I in the flow chart of FIG. 2. Toward this end, the user is presented with program menus and questions which allow him to proceed in the following manner. The user may first be requested to define the text of the image to be photographed in response to which he may enter by way of the keyboard 12 those words which he would wish to appear as text in the image as shown in the first part of the tabulation of FIG. 4. Thus, if the first word which the user should enter under text were "computer", and the second word "graphics" and the last word were "finish", then the basic variable memory 20 would tabulate these words as shown in FIG. 4. The user is thus able to select a maximum of thirty words of text as shown in this example which words are stored in the variable memory 30.

The user might next be asked to select a particular font for the text which he has previously entered into the variable memory 30. The user would then enter by way of the keyboard 12 the font so selected which results would thereafter be tabulated as shown in FIG. 4 for storage in the variable memory 30. As is readily apparent, each tabulation of a particular type of font operates only to qualify a corresponding word of text and thus no new items are added to the righthand column of FIG. 4.

The user may thereafter be asked by the computer program to designate the position of each word of text to which he might respond by way of the keyboard 12 by providing the tabulated position data as shown in FIG. 4. Thus, the first word of text is located by a first set of numbers designating the x position of the first word on the monitor 36 and a second set of numbers designating the Y position of the first word on the monitor 36. In like manner, the position of the second word is then defined by a first set of numbers designating the x position of the second word on the monitor 36 and a second set of numbers designating the y position of the second word on the monitor and so on down the list until the position of the last or thirtieth word is designated. Again, no new items are added to the righthand column of FIG. 4 since the tabulation of position data corresponds to the words of the text previously tabulated.

The user might next be asked to define any lines which he wishes to define on the image which may be utilized as part of a chart, diagram, graph, etc. The user thereafter enters by way of keyboard 12 a first set of numbers designating the x position of the first end of the first line which he wishes to define on the image. A second set of numbers is thereafter entered to define the y position of the first end point of the first line followed by a third set of numbers to designate the x position of the second end point of the first line and a fourth set of numbers to designate the y position of the second end point of the first line. This data is tabulated as shown in FIG. 4 and stored in the variable memory 30 in the aforementioned manner. As is readily apparent, only four sets of numbers are utilized to designate a straight line, and it is not necessary to store information defining each pixel of the line. Other lines may be entered in the aforementioned manner until the end points of the last or fifth line are tabulated as shown in FIG. 4.

The user may next be asked to define the rectangle to which he can respond through the keyboard 12 by entering a first set of numbers defining the x position of the first end point of the diagonal of the rectangle, a second set of numbers designating the y position of the first end point of the diagonal of the rectangle, a third set of numbers designating the x position of the second endpoint of the diagonal of the rectangle, and a fourth set of numbers designating the y position of the second endpoint of the diagonal of the rectangle as shown tabulated in FIG. 4. Again, the information tabulated in FIG. 4 is stored in the variable memory 30 in the aforementioned manner. Other rectangles may be defined in the aforementioned manner with the last of the rectangles being the fifth rectangle shown tabulated in FIG. 4. Again, the rectangle may be designated by four sets of numbers in order to save computer memory capacity since it is not necessary to define each pixel in the rectangle by a tabulated data point.

The user might lastly be asked to select one color from as many as 64 different colors for each of the afore-mentioned items to which he would again respond by way of the keyboard to provide the color tabulation as shown in FIG. 4 which again would be stored by the variable memory 30. Since each color corresponds to a previously-identified item, there are no new items added to the righthand column of FIG. 4 by the tabulated color designations.

Although the computer program has been described as having the user first selecting all the words of text and then selecting the font, color and position for each word of text, it would be readily apparent that the program could alternatively have the user selecting each word of text and immediately after each word of text is selected, thereafter selecting the font, color and position for that word of text. It should be readily understood that the afore-mentioned program for user questions and his tabulated response as shown in FIG. 4 is only presented by way of example and that in actuality the user may be requested to make choices from substantially longer lists of options which may include circles, rectangles, parallelograms, lines, preselected drawings, or any other image stored as digital information. The user may additionally make graphs or charts, and any one of these items can be any color which he chooses from a preselected number of colors made available by the computer program.

Since the user must designate a particular color for each item tabulated in FIG. 4, each item having a color so designated will hereinafter be referred to as a constant color pixel group (CCPG). Thus, each rectangle or line tabulated in FIG. 4 constitutes an individual constant color pixel group (CCPG) and each word of text may also constitute a constant color pixel group (CCPG). For text, however, it may be preferable to group each line of uniformly colored text into one constant color pixel grouping (CCPG). Since the first and second words of text tabulated in FIG. 4 have been specifically designated to be red and blue, respectively, it will be appreciated that these words constitute separate and distinct constant color pixel groupings even though they might appear in the same line of the image.

Referring now to FIG. 3, there is shown the look-up table 20 wherein each of the 64 different colors from which the user may choose to designate each constant color pixel group (CCPG) is tabulated as a function of its exposure time in the three primary red, green, and blue colors for a given exposure light intensity and film speed sensitivity. Once the user has defined the image to be photographed in the aforementioned manner, the computer program implements step II as shown in the flow chart of FIG. 2 to determine the exposure times for each item or constant color pixel group (CCPG) utilizing the tabulated exposure times of FIG. 3 to provide a new tabulation of exposure times for each item (CCPG) as shown in FIG. 5 which is subsequently stored in the variable memory 30. Thus, the exposure time for each constant color pixel group (CCPG) through each of the three primary red, green, and blue color filters is determined from the look-up table 20 by the central processing unit 14 and thereafter stored in the variable memory 30 in the form as shown in FIG. 5.

The central processing unit 14 thereafter provides a command by way of the filter wheel control 26 to the motor control 50 to, in turn, actuate the motor 44 and drive the filter wheel 42 to its starting position which as shown may be with the red filter aligned between the display screen 38 and the lens 46 as illustrated by step III in the flow chart of FIG. 2. The central processing unit 14 thereafter operates in accordance with step IV of the flow chart of FIG. 2 to sort the constant color pixel groupings (CCPG's) into a descending order of exposure times for the red filter position as shown tabulated in the upper portion of FIG. 6 which tabulation is also stored in the variable memory 30. As is readily apparent, more than one item or constant color pixel group may require the same exposure time through the red color filter as, for example, both items one and two require thirty seconds for exposure through the red color filter. Since the constant color pixel groups (CCPG's) are ordered in a progressively decreasing sequence, those items requiring the longest exposure times are included throughout the lefthand column with each succeeding item or constant color pixel group (CCPG) in the ordered sequence of exposure times being added until all the constant color pixel groups (CCPG's) requiring the least time of exposure are tabulated. Thus, for the example as shown in FIG. 6, items one and two require the longest time of exposure (thirty seconds) through the red color filter and are thus tabulated first in the ordered sequence of exposure times. Item number eight requires twenty-five seconds of exposure time through the red color filter and thus is tabulated next along with items one and two which require more than twenty-five seconds of exposure to the red color filter. The minimum exposure time required through the red color filter is four seconds, and thus all the items which require any exposure at all through the red color filter are included in this tabulation.

The central processing unit 14 implements the next step as shown in block V of the flow chart of FIG. 2 by getting the next item to be exposed from the ordered tabulation of items in FIG. 6 which for the first items in our example would be items one and two. The next step implemented by the central processing unit 14 as shown in block VI of FIG. 2 operates to set all the bits to binary logic 1's in the image memory 22 which correspond to the items to be displayed (item numbers one and two). This is accomplished by using select algorithms stored in the CCPG generators 24 in order to generate the particular items (CCPG's) to be displayed along with any other necessary inputs to these algorithms which may be stored in the variable memory 30.

The next step implemented by the central processing unit 14 as shown in block VII of the flow chart of FIG. 2 operates to display the image memory 22 to the film 48. Thus, the central processing unit 14 provides a signal by way of the video converter 32 and CRT beam drive 34 to activate the CRT 40 turning on the CRT beam to display those items (CCPG's) previously drawn to the image memory 22 in the aforementioned step VI. For the example illustrated by the tabulation of FIG. 6, items one and two are displayed on the screen 38 at a constant electron beam intensity for exposure through the red filter to the film 48. The central processing unit 14 times the exposure by way of the timer program 28 to wait for the difference between the exposure time of this group of items (CCPG's) and the exposure time of the next succeeding group of items (CCPG's) which difference for the example as shown in FIG. 6 is five seconds. Thus, the exposure is timed as shown in step VIII of FIG. 2 and thereafter ended by a stop command from the central processing unit 14 to the CRT 40 by way of the video converter 32 and CRT beam drive 34 as shown in step IX of the flow chart of FIG. 2.

The central processing unit 14 thereafter commands a repeat of the aforementioned steps for all of the items to be exposed through the red filter as shown in step X of the flow chart of FIG. 2. The next item (CCPG) to be drawn for exposure in step VI of the flow chart of FIG. 2 in our example is item eight to which the film must be exposed for twenty-five seconds. Thus, item eight in addition to the two previously-drawn items one and two are displayed next for exposure to the film. The central processing unit 14 continues the program until those items requiring the least exposure through the red color filter are displayed on the screen 38 for the minimum exposure time which in our example from FIG. 6 is four seconds.

As is readily apparent, since the items (CCPG's) are sequentially ordered in a sequence of descending exposure times with those items (CCPG's) requiring the greatest exposure listed first, then each succeeding display on the CRT will show the previously-displayed items (CCPG's) and the exposure time for each step will be equal to the difference between the exposure time for that group of items (CCPG's) and the exposure time for the next succeeding group of items (CCPG's) on the tabulated list of FIG. 6. Once all the items (CCPG's) to which the film is to be exposed through the red filter are completed, then the afore-mentioned steps are repeated for all the color filter positions as shown by step XI in the flow chart of FIG. 2. Thus, the filter is moved to the next filter position which in our example is the green filter position and all the items (CCPG's) to which the film is to be exposed through the green filter are listed in descending order of exposure times as shown by the middle portion of the tabulated list in FIG. 6. The process is repeated in the aforementioned manner until all the items (CCPG's) to which the film is to be exposed through the green filter are exposed for their appropriate exposure times. Step XI of the flow chart of FIG. 2 is again repeated by the central processing unit 14 to move the filter wheel 42 so that the blue filter overlies the screen 38 whereupon the process is repeated for all the items (CCPG's) to which the film 48 is to be exposed by way of the blue filter. Thus, as is readily apparent since the electron beam intensity remains constant, the image memory 22 need only be required to store a bit of information signifying whether the electron beam is either on or off for each pixel of the image to be displayed thereby substantially reducing the heretofore required memory for such computer imaging systems.

Although step IV of the flow chart of FIG. 2 describes listing the items (CCPG's) in descending order of exposure times, it will be readily apparent that the items (CCPG's) could alternatively be listed in a progressively increasing order of exposure times so as to reverse the order of sequence as tabulated in the list of FIG. 6. In such case, all of the items (CCPG's) to be exposed to any particular filter color would be displayed first thereafter eliminating from the visual display each succeeding item (CCPG's) in the ordered sequence so as to finally display only the last of the items (CCPG's) which require the longest exposure times and which in the example shown in FIG. 6 for the red color filter would be item numbers one and two. It will also be readily apparent that although the CRT 40 is illustrated, it will be equally apparent to also utilize any light source arrangement emitting light in the red, green, and blue spectrum in place of the CRT. In addition, although the CRT 40 has been described as being controlled by the central processing unit to end the display of each group of items (CCPG's) during each incremental exposure time, it would be equally apparent that this timing function could be accomplished by an appropriate shutter arrangement timed by the central processing unit. It will also be apparent that the (CCPG's) could alternatively be generated with select electronic circuits instead of the aforementioned computer implemented algorithms.

Other embodiments of the invention, including additions, subtractions, deletions and other modifications of the preferred disclosed embodiments of the invention will be obvious to those skilled in the art and are within the scope of the following claims.

What is claimed is:

1. A method for defining and photographing an image comprising the steps of:
    defining and storing within a computer memory the image to be photographed as a plurality of constant color pixel groups;
    determining the time during which a selected photosensitive material must be exposed to a selected light color and intensity for each of said constant color pixel groups;
    ordering said determined exposure times for each of said constant color pixel groups into either a progressively increasing or decreasing sequence; and
    visually displaying at said selected light color and intensity each of said constant color pixel groups for its said determined exposure time to the photosensitive material either starting with the first of said constant color pixel groups in said ordered sequence and thereafter adding succeeding constant color pixel groups in said ordered sequence to said visual display so as to finally display all of said constant color pixel groups simultaneously in said ordered sequence when said ordered sequence comprises progressively decreasing exposure times or, alternatively, starting by simultaneously displaying all of said constant color pixel groups in said ordered sequence and thereafter eliminating from said visual display succeeding constant color pixel groups in said ordered sequence so as to finally display only the last of said constant color pixel groups in said ordered sequence when said ordered sequence comprises progressively increasing exposure times.

2. The method of claim 1 wherein the exposure time for each of said constant color pixel groups is determined through a look-up table stored in the computer memory.

3. The method of claim 1 wherein said light color is selected in another ordered sequence from the three primary red, green, and blue colors and wherein said exposure times are determined for each of said primary red, green, and blue colors for each of said constant color pixel groups.

4. The method of claim 3 wherein said constant color pixel groups are visually displayed on a black-and-white display screen and wherein said ordered sequence of primary colors is provided by sequentially moving red, green, and blue filters over said black-and-white display screen.

5. The method of claim 4 wherein each of said constant color pixel groups in said ordered sequence is displayed by a control processor affirmatively setting binary logic bits in a computer image memory corresponding to the constant color pixel group to be displayed in response to selected algorithms stored in the computer memory for generating the constant color pixel groups.

6. The method of claim 4 wherein the exposure of the photosensitive material is terminated at least during the movement from one primary color filter over said display screen to another primary color filter over said display screen.

7. A system for defining and displaying an image for photographic reproduction comprising:
    video display means for visually displaying the image to be photographed; and
    computer means responsive to user controlled input signals and a preselected program for defining and storing within a computer memory the image to be photographed as a plurality of constant color pixel groups; for thereafter determining the time during which a selected photosensitive material must be exposed to a selected light color and intensity for each of said constant color pixel groups; for thereafter ordering said determined exposure times for each of said constant color pixel groups into either a progressively increasing or decreasing sequence; and for finally providing a video image signal to said video display means in order to display at said selected light color and intensity each of said constant color pixel groups for its said determined exposure time to the photosensitive material, said computer means starting said video image signal either with the first of said constant color pixel groups in said ordered sequence and thereafter adding succeeding constant color pixel groups in said ordered sequence to said video image signal so as to finally simultaneously include in said video image signal all of said constant color pixel groups in said ordered sequence when said ordered sequence comprises progressively decreasing exposure times or, alternatively, with all of said constant color pixel groups in said ordered sequence and thereafter eliminating from said video image signal succeeding constant color pixel groups in said ordered sequence so as to finally include in said video image signal only the last of said constant color pixel groups in said ordered sequence when said ordered sequence comprises progressively increasing exposure times.

8. The system of claim 7 wherein said computer means comprises a look-up table stored in the computer memory for determining the exposure time for each of said constant color pixel groups.

9. The system of claim 7 wherein said light color is selected in another ordered sequence from the three primary red, green, and blue colors and wherein said exposure times are determined for each of said primary red, green, and blue colors for each of said constant color pixel groups.

10. The system of claim 9 wherein said display means comprises a black-and-white display screen and wherein said system further comprises means for sequentially moving red, green, and blue filters over said black-and-white display screen to provide said ordered sequence of primary colors.

11. The system of claim 10 wherein said computer means comprises central processing means for affirmatively setting binary logic bits in a computer image memory corresponding to the constant color pixel group to be displayed responsive to selected algorithms stored in the computer memory for generating the constant color pixel groups.

12. The system of claim 10 including means for terminating the video image signals at least during the movement from one primary color filter over said display screen to another primary color filter over said display screen.

13. Auxiliary apparatus for use with a computer, said apparatus comprising:

means for presenting light emitting displays for photographic recording on a selected photosensitive material in operative relation with respect to said display means; and means responsive to user controlled input signals for cooperating with the computer to define and store within the memory of the computer information, indicative of the final complete image to be recorded on selected photosensitive material, as a plurality of constant color pixel groups; to determine the time during which the selected photosensitive material must be exposed to light emitting from said display means to record image information thereon corresponding to each of said constant color pixel groups; to thereafter order said determined exposure times for each of said constant color pixel groups into either a progressively increasing or decreasing time sequence; and to finally sequentially provide a plurality of signals to said display means required to display each of said constant color pixel groups for its said determined exposure time to the selected photosensitive material, said plurality of signals being presented to said display means during at least a portion of the photosensitive material exposure operation to either sequentially add succeeding constant color pixel groups in said ordered sequence when said ordered sequence comprises progressively decreasing exposure times or, alternatively, to sequentially subtract succeeding constant color pixel groups in said ordered sequence when said ordered sequence comprises progressively increasing exposure times.

* * * * *